(12) United States Patent
Yoneda et al.

(10) Patent No.: US 8,149,808 B2
(45) Date of Patent: Apr. 3, 2012

(54) ELECTRONIC APPARATUS HAVING COMMUNICATION FUNCTION AND CONTROL METHOD

(75) Inventors: Michiaki Yoneda, Kanagawa (JP); Masataka Yoritate, Tokyo (JP)

(73) Assignee: Sony Corporation, Tokyo (JP)

( * ) Notice: Subject to any disclaimer, the term of this patent is extended or adjusted under 35 U.S.C. 154(b) by 1057 days.

(21) Appl. No.: 11/101,144

(22) Filed: Apr. 7, 2005

(65) Prior Publication Data
US 2005/0238029 A1 Oct. 27, 2005

(30) Foreign Application Priority Data
Apr. 9, 2004 (JP) ................................ P2004-115768

(51) Int. Cl.
*H04W 4/00* (2009.01)
*H04L 12/50* (2006.01)
*H04L 12/28* (2006.01)
*H04Q 11/00* (2006.01)
*H04J 3/16* (2006.01)
*H04J 3/22* (2006.01)
*G06F 15/173* (2006.01)
*G06F 15/16* (2006.01)

(52) U.S. Cl. ........ 370/341; 370/360; 370/371; 370/392; 370/398; 370/471; 709/223; 709/231; 709/232; 709/239; 709/240; 709/241; 709/242; 709/243; 709/244; 709/245

(58) Field of Classification Search ................. 370/351
See application file for complete search history.

(56) References Cited

U.S. PATENT DOCUMENTS

| 5,884,024 A * | 3/1999 | Lim et al. ........................ 726/3 |
| 6,246,670 B1 | 6/2001 | Karlsson et al. |
| 7,441,019 B2 * | 10/2008 | Zintel et al. .................... 709/220 |
| 2002/0021689 A1 * | 2/2002 | Robbins et al. ............... 370/352 |
| 2003/0177220 A1 * | 9/2003 | Ohara ........................... 709/223 |
| 2005/0198344 A1 * | 9/2005 | Fujita ............................ 709/231 |
| 2005/0198357 A1 * | 9/2005 | Fujita ............................ 709/232 |
| 2006/0218257 A1 * | 9/2006 | Kaibe ........................... 709/220 |
| 2008/0195725 A1 * | 8/2008 | Ohara ........................... 709/220 |

FOREIGN PATENT DOCUMENTS

JP 2005-217976 A 8/2005

OTHER PUBLICATIONS

Droms et al., "Dynamic Host Configuration Protocol for IPv6 (DHCPv6)," IETF Standard, Internet Engineering Task Force, IETF, CH, Jul. 2003, pp. 1-101.

* cited by examiner

Primary Examiner — Nishant Divecha
(74) Attorney, Agent, or Firm — Wolf, Greenfield & Sacks, P.C.

(57) ABSTRACT

An address of a terminal on a network is fixed during the session. The present invention provides an electronic apparatus that can be connected to a network, including, a communication unit communicating with another electronic apparatus existing on the network, a temporary-address setting unit setting a temporary address that is temporarily valid on the network, an address-requesting unit requesting that an address management apparatus connected to the network should set an address at a predetermined timing, when the temporary address is set, and an address-request stopping unit inhibiting the address-requesting unit from operating, while the communication unit is communicating with the other electronic apparatus, by using the temporary address.

10 Claims, 4 Drawing Sheets

ELECTRONIC APPARATUS HAVING COMMUNICATION FUNCTION AND CONTROL METHOD

The present invention contains subject matter related to Japanese Patent Application JP 2004-115768 filed in the Japanese Patent Office on Apr. 9, 2004, the entire contents of which being incorporated herein by reference.

BACKGROUND OF THE INVENTION

1. Field of the Invention

The present invention relates to an electronic apparatus that can be connected to a network and a method of controlling this electronic apparatus.

2. Description of the Related Art

Among the network protocols widely used at preset is TCP (Transmission Control Protocol)/IP (Internet Protocol). TCP/IP is constituted by five hierarchical layers. The five layers are a physical layer, a network-interface layer, an Internet layer, a transport layer, and an application layer. For each hierarchical layer, a network management method has been stipulated.

The Internet layer of TCP/IP defines a mechanism and a packet format. The mechanism transfers packets from one apparatus to the end-destination. The packet format is applied to packets that should be transmitted through the Internet layer.

The packets transmitted through the Internet layer are called IP packets. Each IP packet consists of an IP header and a data part. The IP header contains a destination IP address and a source IP address. The relays provided on the network transfer packets to the target terminal, in accordance with these IP addresses.

DHCP (Dynamic Host Configuration Protocol) is a protocol that automatically allocates IP addresses to the terminals provided on the network. A DHCP server may receive an IP-address allocation request from a terminal. Upon receiving the request, the DHCP server transmits an appropriate IP address to the MAC (Media Access Control) address of the terminal that has made the IP-address allocation request. (See, for example, Jpn. Pat. Appln. Laid-Open Publication No. 2001-36561.)

The terminal may have no response from the DHCP server or may be informed that no IP address can be allocated from the DHCP server. In either case, the terminal performs APIA (Automatic Private IP Addressing) function. The APIA function is to automatically set one of the private IP addresses for AutoIP, which does not exist on the same network. The IP address thus allocated by performing the APIA function is called AutoIP address.

After setting the Auto IP address, the terminal searches for the DHCP server at specific time intervals. Upon finding the DHCP server and thus obtaining the IP address, the terminal discards the AutoIP address set by the APIA function and switches the address to the IP address acquired from the DHCP server. This switching of addresses is automatically accomplished even while the terminal is communicating with any other terminal by using the AutoIP address.

When the IP address is switched to another during the session, a transmission error will occur. During a long-lasting session such as streaming distribution of data, it is quite possible that the IP address is switched. If the IP address is switched during the streaming distribution, the playback of contents is interrupted.

SUMMARY OF THE INVENTION

It is desirable to provide an electronic apparatus that fixes an address of a terminal on a network during the session, and a method of controlling this electronic apparatus.

To achieve the object, an electronic apparatus according to this invention can be connected to a network. The electronic apparatus comprises: a communication means that communicates with another electronic apparatus existing on the network; a temporary-address setting means that sets, a temporary address that is temporarily valid on the network; an address-requesting means which requests that an address management apparatus connected to the network should set an address at a predetermined timing, when the temporary address is set; and an address-request stopping means that inhibits the address-requesting means from operating, while the communication means is communicating with the other electronic apparatus, by using the temporary address.

A control method according to the invention is designed to control an electronic apparatus that can be connected to a network. The method comprises: an address-requesting step of requesting that an address management apparatus connected to the network should set an address; a temporary-address setting step of setting a temporary address that is temporary valid on the network, when no addresses are set in the address-requesting step; an address-re-requesting step of requesting that the address management apparatus should set a permanent address, at a prescribed timing while the temporary address remains valid; and an address-request stopping step of causing the address management apparatus to stop requesting for addresses, while the electronic apparatus is communicating, by using the temporary address, with any other electronic apparatus that exists on the network.

In the present invention, no requests for setting an address are supplied to the address management apparatus while the electronic apparatus is communicating with any other electronic apparatus, by using the AutoIP address. Hence, the address is not switched while the apparatus is communicating with the other electronic apparatus. Since the address is not switched, the communication is not to be interrupted at all.

DETAILED DESCRIPTION OF THE PREFERRED EMBODIMENTS

The present invention is applied to electronic apparatuses that can be connected to a network. The electronic apparatuses may be data-processing apparatuses such as a personal computer, a PDA (Personal Digital Assistant) and a network terminal, communications apparatuses such as a mobile telephone and a PHS (Personal Handy Phone), peripheral apparatuses such as a printer and a scanner, or household apparatuses such as a television set, a DVD player and an HD (Hard Disc) recorder.

Figure 1:
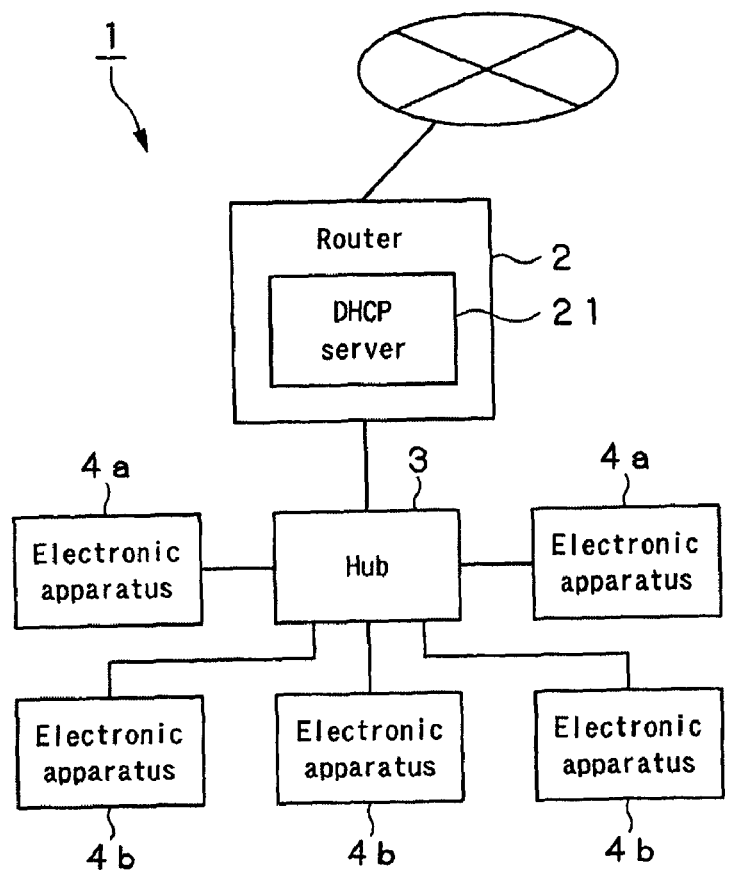
FIG. 1 is a block diagram showing a LAN to which the present invention is applied.

As FIG. 1 shows, such electronic apparatuses are connected to a LAN (Local Area Network) 1. Each apparatus can therefore receive data from, and transmit data to, any other apparatus. As illustrated in FIG. 1, the LAN 1 comprises a router 2, a hub 3, and a plurality of electronic apparatuses 4a to 4e. The electronic apparatuses 4a to 4e are connected to the hub 3. The hub 3 is connected to the router 2. The router 2 is connected to an external network such as the Internet. The LAN shown in FIG. 1 is nothing more than an example. Any other type of a LAN that comprises a DHCP server (later described) and a plurality of electronic apparatuses 4a to 4e falls within the scope of the present invention. The hub 3 may be replaced by a radio LAN.

Figure 2:
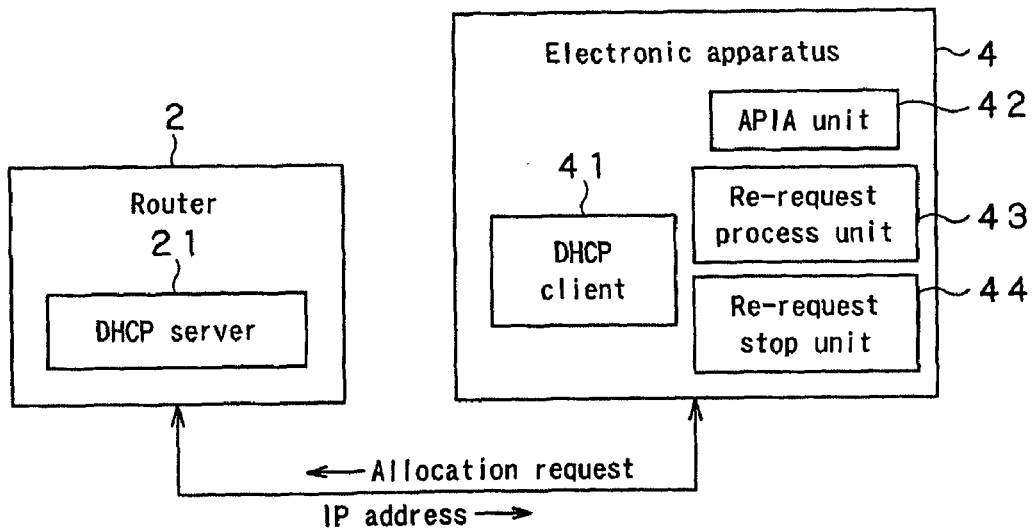
FIG. 2 is a block diagram illustrating the software configuration of the electronic apparatus and a router.

As FIG. 2 depicts, the router 2 has a DHCP (Dynamic Host Configuration Protocol) server 21. The DHCP server 21 allocates an IP address to any electronic apparatus 4 when it receives a request from the electronic apparatus 4.

Each electronic apparatus 4 comprises a DHCP client 41, an APIA (Automatic Private IP addressing) unit 42, a re-request process unit 43, and a re-request stop unit 44. The DHCP client 41 requests the DHCP server 21 for an IP address. The APIA unit 42 acquires an Auto IP address. The re-request process unit 43 causes the DHCP client 41 to request for an IP address at regular intervals. The re-request stop unit 44 causes the re-request process unit 43 to stop operating.

The DHCP client 41 requests that the DHCP server 21 should allocate an IP address to the electronic apparatus 4. In response to the request, the DHCP server 21 allocates an IP address, a default gateway and a sub-net mask to the electronic apparatus 4. The DHCP server 21 may fail to allocate an IP address to the apparatus 4. In this case, the APIA unit 42 is activated. The APIA unit 42 retrieves an IP address that is not used on the LAN and allocate this IP address to the electronic apparatus 4. The IP address that the APIA unit 42 allocates to the apparatus 4 is called AutoIP address. The AutoIP address is temporarily valid. When the DHCP server 21 successfully allocates an IP address, the re-request process unit 43 discards the IP address allocated by the APIA unit 42, and switches the address to the IP address obtained from the DHCP server 21.

The re-request process unit 43 drives the DHCP client 41 at regular intervals. The DHCP client 41 demand that the DHCP server 21 should allocate an IP address, in response to the instruction given by the re-request process unit 43. The DHCP server 21 therefore allocates an IP address to the electronic apparatus 4. Then, the IP address of the electronic apparatus 4 is switched, from the AutoIP address to the new IP address.

As indicated above, the electronic apparatus 4 comprises the re-request stop unit 44. The re-request stop unit 44 inhibits the re-request process unit 43 from operating until the electronic apparatus 4 finishes any session with any other electronic apparatus 4. Hence, the IP address is fixed at the AutoIP address as long as one session goes on. This prevents transmission errors that may otherwise occur when the IP address is switched during the session.

It will be described how the re-request stop unit 44 inhibits the re-request process unit 43 from operating, in the course of streaming. The streaming is a technique of downloading audio data and moving-picture data from a streaming server to a client via a network, and playing back the audio data and moving-picture data in the client. In the streaming, the IP packets received are sequentially played back in the client before all data is completely downloaded to the client. Inevitably, the playback of contents is interrupted when a transmission error takes place while the contents are being distributed.

Figure 3:
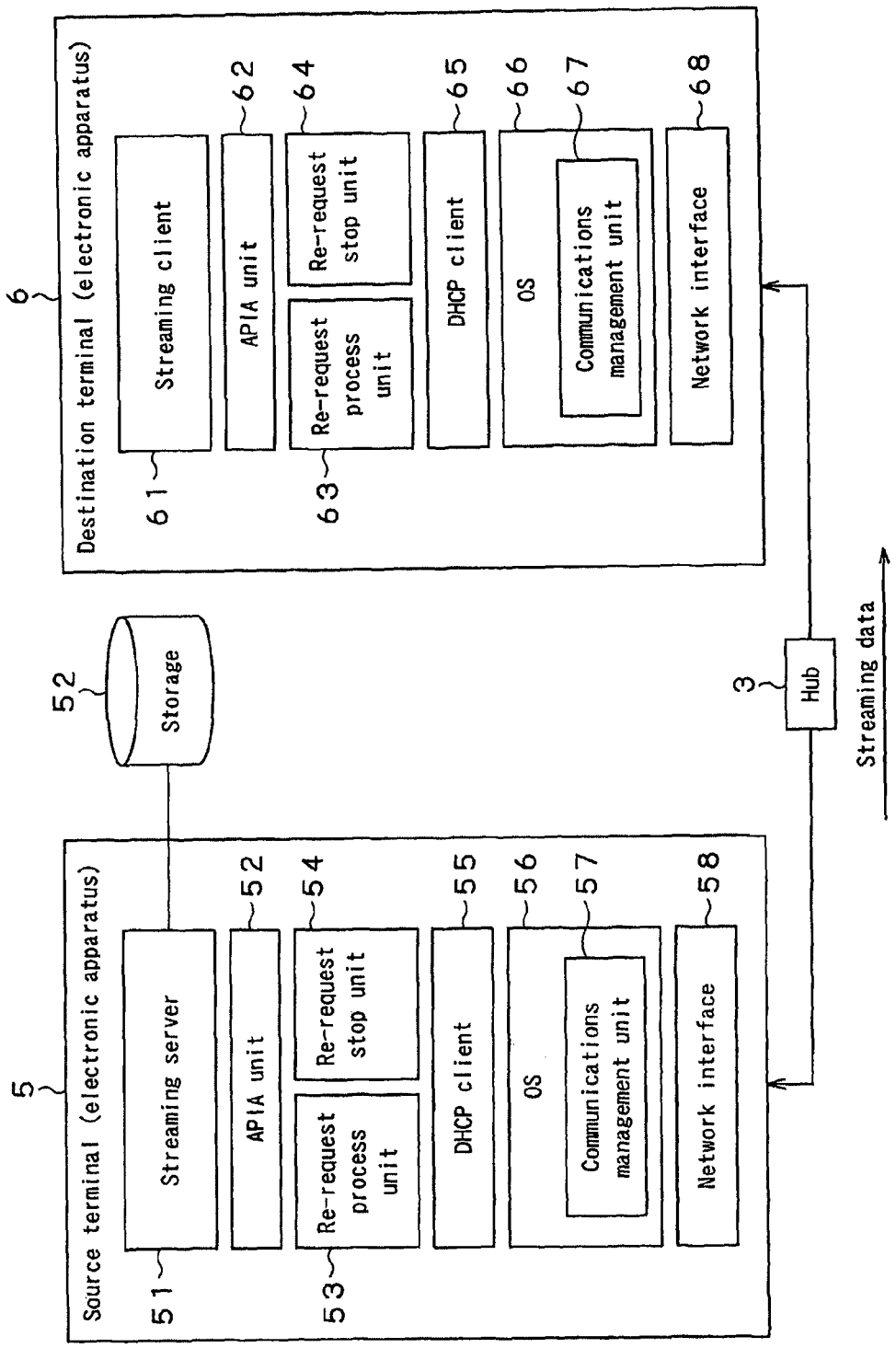
FIG. 3 is a block diagram depicting the software configuration of a source terminal and a destination terminal.

FIG. 3 is a block diagram showing a source terminal 5 and a destination terminal 6. Assume that the source terminal 5 is distributing contents to the destination terminal 6 by means of streaming. Both terminals 5 and 6 identical to the electronic apparatuses 4a to 4e that are shown in FIG. 1, except that each has a function of transmitting and playing back streaming data. The source terminal 5 has a streaming server 51 that accomplishes streaming distribution. The streaming server 51 compresses the contents stored in a storage 52 and outputs the contents to an OS (Operating System) 56. The OS 56 has a communications management unit 57. The unit 57 generates IP packets from the data input to it. The IP packets are output to a network interface 58 of, for example, the Ethernet (trademark). The network interface 58 outputs the IP packets to the LAN 1.

The destination terminal 6 comprises an OS 66, a streaming client 61, and an output unit (not shown) such as a display or a speaker. The OS 66 has a communications management unit 67. The communications management unit 67 extracts data part from the IP packets received by a network interface 68. The data part thus extracted is output to the streaming client 61. The streaming client 61 receives the IP packets distributed from the streaming server 51 and converts the IP packets, one after another, to playback signals. The output unit (not shown) converts each playback signal into sound or an image, which is output.

The source terminal 5 and destination terminal 6 have a DHCP client 55 and a DHCP client 65, respectively. The DHCP clients 55 requests that the DHCP server 21 should allocate IP addresses to the source terminal 5. Similarly, the DHCP clients 65 requests that the DHCP server 21 should allocate IP addresses to the destination terminal 6. Both terminals 5 and 6 need not have a DHCP client. It suffices to provide a DHCP client in only one of the terminals 5 and 6.

According to TCP/IP, contents are inserted into IP packets, which are transmitted. The header of each IP packet describes the IP address of the source terminal 5 and the address of the destination terminal 6. The streaming may be interrupted when the IP address of the source terminal 5 or destination terminal 6 is switched to another during the streaming.

While any terminal is performing communication by using the AutoIP address, the IP address of the terminal is switched, from the AutoIP address to the IP address allocated by the DHCP server, when the DHCP server is activated or when the DHCP server allocates an IP address.

If the IP address of the destination terminal 6 changes, the router 2 or the hub 3 can no longer identify the destination terminal 6. A distribution error is inevitably made. On the other hand, if the IP address of the source terminal 5 changes, the Ack signal output from the destination terminal 6 cannot reach the source terminal 5. The streaming server 51 may interrupt the streaming for security, when if Ack signals stop coming to it.

Figure 4:
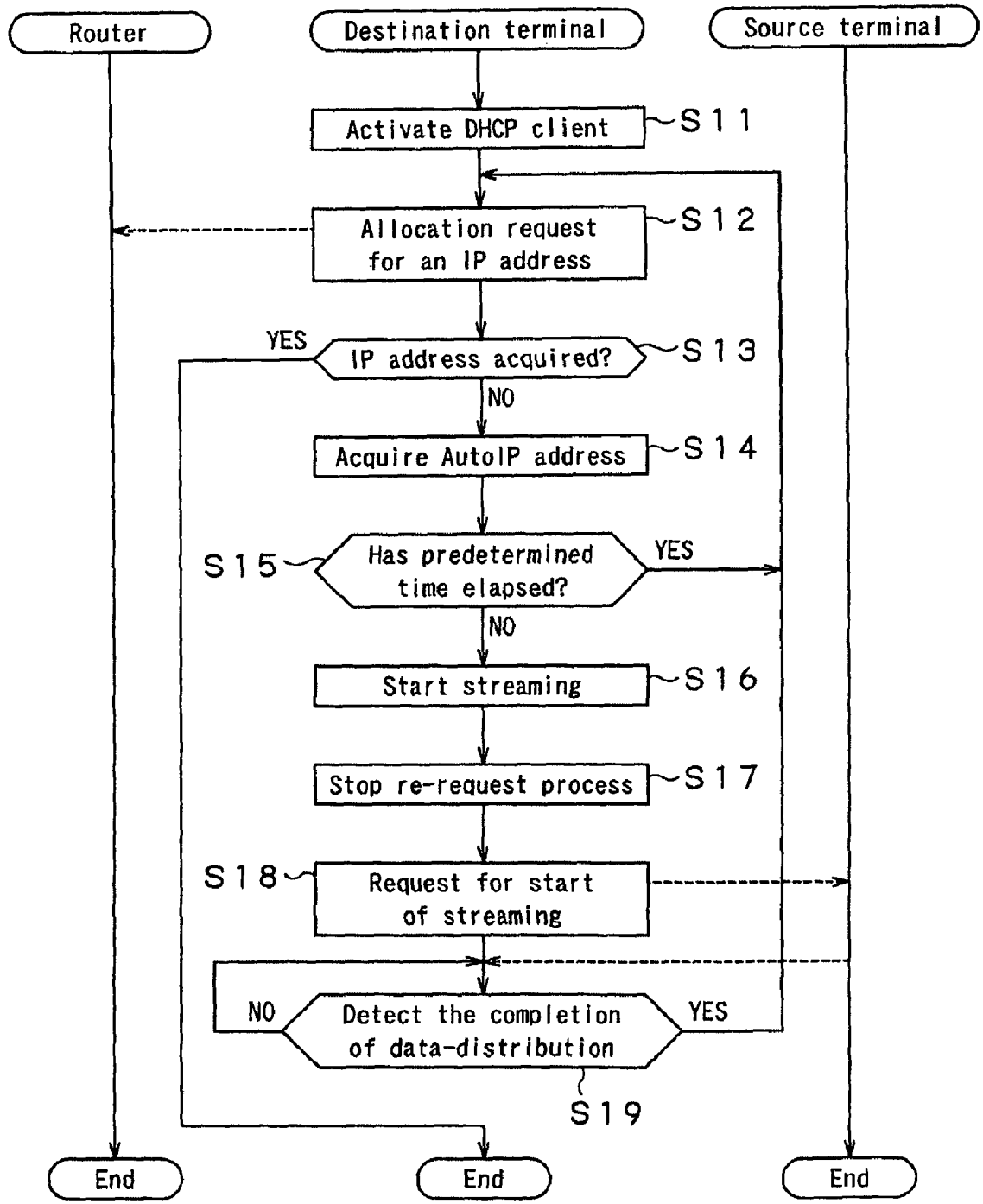
FIG. 4 is a flowchart explaining how the destination terminal operates while its AutoIP address remains fixed.

To prevent the interruption of streaming, the DHCP clients 55 and 65 stop re-requesting for an IP address, before they start the streaming. How the destination terminal 6 operates will be described, with reference to FIG. 4. How the source terminal 5 operates will be described, with reference to FIG. 5.

In the destination terminal 6, the DHCP client 65 is activated if no IP address is set for the destination terminal 6 (Step S11). The DHCP client 65 requests that the DHCP server 21 of the router 2 should allocate an IP address to the destination terminal 6 (Step S12). If the DHCP server 21 makes no response or informs that no IP address can be allocated to the destination terminal 6 (NO in Step S13), the DHCP client 65 acquires an AutoIP address by using the APIA function (Step S14). If an IP address is allocated from the DHCP server 21 (YES in Step S13), the DHCP client 65 performs communication, by using this IP address.

Upon lapse of a predetermined time (YES in Step S15), the operation returns to Step S12, in which the re-request process unit 63 outputs a request that the DHCP server 21 should allocate an IP address. Before the predetermined time elapses (NO in Step S15), the user may instruct that the streaming be started (Step S16). In this case, the re-request stop unit 64 stops the re-request process unit 63 (Step S17). After the re-request process unit 63 is stopped, the streaming client 61 requests that the streaming server 51 should distribute the contents (Step S18). So requested, the streaming server 51 distributes the contents. While the server 51 is distributing the contents, the IP address of the destination terminal 6 remains fixed. Hence, no distribution errors would occur.

As long as the contents are distributed (NO in Step S19), the re-request stop unit 64 keeps the re-request process unit 63 in inoperative state. When it is detected that all contents have been distributed (YES in Step S19), the operation returns to Step S12. In Step S12, the re-request process unit 63 is operated again. Whether the all contents have been distributed is detected when there is received a packet in which a transfer completion flag FIN is set, or a signal that instructs the content distribution should be stopped.

Figure 5:
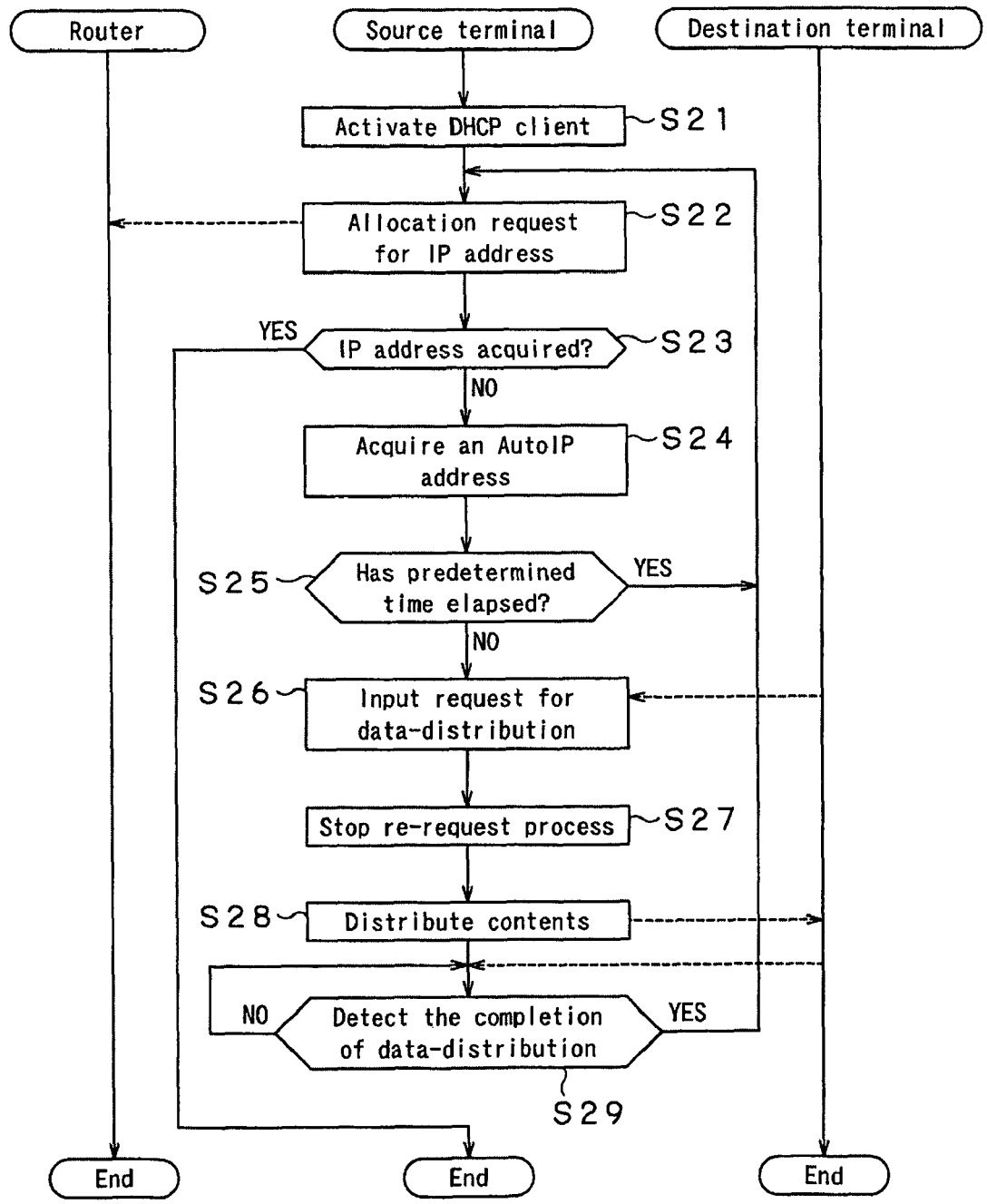
FIG. 5 is a flowchart explaining how the source terminal operates while its AutoIP address remains fixed.

How the source terminal 5 operates will be described, with reference to FIG. 5. In the source terminal 5, the DHCP client 55 is activated if no IP addresses have been allocated to the source terminal 5 (Step S21). The DHCP client 55 requests that the DHCP server 21 of the router 2 should allocate an IP address to the source terminal 5 (Step S22). If the DHCP server 21 makes no response or informs that no IP address can be allocated to the source terminal 5 (NO in Step S23), an AutoIP address is acquired by using the APIA function (Step S24). If the DHCP server 21 allocates an IP address to the source terminal 5 (YES in Step S23), the process according to this invention is stopped.

Upon lapse of a predetermined time (YES in Step S25), the re-request process unit 53 performs Step S22, outputting an IP-address allocation request to the DHCP server 21. Before the predetermined time lapses (NO in Step S25), the re-request stop unit 54 may receive a content distribution request from the streaming client 61 (Step S26). Then, the re-request stop unit 54 stops the re-request process unit 53 (Step S27). After the re-request process unit 53 is stopped, the streaming server 51 distributes the contents from the storage 52 to the streaming client 61 (Step S28).

As long as the contents are distributed (NO in Step S29), the re-request stop unit 54 keeps the re-request process unit 53 in inoperative state. When an event takes place, indicating that all contents have been distributed (YES in Step S29), the operation returns to Step S22. In Step S22, the re-request process unit 53 is operated again. The event that indicates the completion of content distribution is the receipt of all contents or a signal that the streaming client 61 supplies to instruct that the content distribution be stopped.

As has been described, the electronic apparatus 4 (i.e., a source terminal or a destination terminal) performs no re-request process, until it terminates session with any other electronic apparatus, thus preventing the IP address from being switched during the session.

The present invention can prevent the IP address of a terminal from being switched, during a long-lasting session such as a real-time interactive service (e.g., chat or electronic meeting) or the downloading of a great amount of data.

It should be understood by those skilled in the art that various modifications, combinations sub-combinations and alterations may occur depending on design requirements and other factors insofar as they are within the scope of the appended claims or the equivalents thereof.

What is claimed is:

1. An electronic apparatus that can be connected to a network, the electronic apparatus comprising:
   communication interface for communicating with at least one other electronic apparatus existing on the network; and
   an Automatic Private IP addressing (APIA) unit, implemented by at least one processor, that sets a temporary address that is temporarily valid on the network, after it is determined that an address management apparatus connected to the electronic apparatus over the network has not set an address for the electronic apparatus upon a request from the electronic apparatus;
   an address-requesting unit, implemented by the at least one processor, that requests, at predetermined time intervals, that the address management apparatus set the address for the electronic apparatus in accordance with Dynamic Host Configuration Protocol (DHCP), when the temporary address is set; and
   an address-request stopping unit, implemented by the at least one processor, that:
      in response to an instruction received during a time interval of the predetermined time intervals that instructs the electronic apparatus to start a communication session to distribute streaming data between the communication interface and the at least one other electronic apparatus, inhibits the address-requesting unit from requesting that the address management apparatus set the address for the electronic apparatus in accordance with the DHCP, wherein the inhibition prevents switching during the communication session from the temporary address to the address provided to the electronic apparatus by the address management apparatus; and
      when it is determined that the streaming data has been distributed and the electronic apparatus has terminated the communication session, stops inhibiting the address-requesting unit from requesting that the address management apparatus set the address for the electronic apparatus in accordance with the DHCP.

2. The electronic apparatus according to claim 1, wherein the APIA unit sets an AutoIP address being used as temporary address.

3. The electronic apparatus according to claim 1, wherein the address-requesting unit requests an IP (Internet Protocol) address in accordance with the DHCP.

4. The electronic apparatus according to claim 1, wherein the electronic apparatus comprises a source terminal sending the streaming data.

5. The electronic apparatus according to claim 1, wherein the electronic apparatus comprises a destination terminal receiving the streaming data.

6. The electronic apparatus according to claim 1, wherein the instruction comprises a user instruction.

7. A method of controlling at least one electronic apparatus that can be connected to a network, the method comprising:
   an address-requesting step of requesting by the at least one electronic apparatus that an address management apparatus connected to the network set an address for the electronic apparatus;
   a temporary-address setting step of setting a temporary address that is temporarily valid on the network, after it is determined that the address for the at least one electronic apparatus is not set in the address-requesting step;
   an address-re-requesting step of requesting by the at least one electronic apparatus, at predetermined time intervals, that the address management apparatus set the address for the at least one electronic apparatus, while the temporary address remains valid;

an address-request stopping step of, in response to an instruction received during a time interval of the predetermined time intervals that instructs the at least one electronic apparatus to start a communication session to distribute streaming data between the at least one electronic apparatus and at least one other electronic apparatus that exists on the network, causing the at least one electronic apparatus to stop requesting the address management apparatus to set the address for the at least one electronic apparatus, to prevent switching, during the communication session, from the temporary address to the address provided to the electronic apparatus by the address management apparatus; and a step of, when it is determined that the streaming data has been distributed and the at least one electronic apparatus has terminated the communication session, stopping inhibiting the at least one electronic apparatus to request the address management apparatus to set the address for the at least one electronic apparatus.

8. An electronic apparatus that can be connected to a network, the electronic apparatus comprising:

a communication interface communicating with at least one other electronic apparatus existing on the network; and a temporary-address setting unit, implemented by at least one processor, that sets a temporary address temporarily valid on the network, after, upon a request from the electronic apparatus, an address for the electronic apparatus is not set by an address management apparatus connected to the electronic apparatus over the network;

an address-requesting unit, implemented by the at least one processor, that requests, at predetermined time intervals, that the address management apparatus set the address for the electronic apparatus, when the temporary address is set; and an address-request stopping unit, implemented by the at least one processor, that:

in response to an instruction received during a time interval of the predetermined time intervals that instructs the electronic apparatus to start a communication session to distribute streaming data between the communication unit interface and the at least one other electronic apparatus, inhibits the address-requesting unit from operating while the communication interface is communicating with the at least one other electronic apparatus using the temporary address, to prevent switching from the temporary address to the address provided to the electronic apparatus by the address management apparatus; and when it is determined that the streaming data has been distributed and the electronic apparatus has terminated the communication session, stops inhibiting the address-requesting unit from operating.

9. The electronic apparatus according to claim 8, wherein the temporary-address setting unit sets an AutoIP address by using an Automatic Private IP addressing (APIA) function, and wherein the AutoIP address is being used as the temporary address.

10. The electronic apparatus according to claim 8, wherein the address-requesting unit requests an Internet Protocol (IP) address in accordance with a Dynamic Host Configuration Protocol (DHCP).

* * * * *